United States Patent
Bahnsen et al.

(10) Patent No.: US 10,275,817 B2
(45) Date of Patent: Apr. 30, 2019

(54) OBTAINING VENDOR INFORMATION USING MOBILE INTERNET DEVICES

(75) Inventors: Robert Bruce Bahnsen, Boulder, CO (US); Robert Gittins, Divide, CO (US); Robert Swanson, Olympia, WA (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/991,581

(22) PCT Filed: Dec. 22, 2011

(86) PCT No.: PCT/US2011/066935
§ 371 (c)(1),
(2), (4) Date: Sep. 18, 2014

(87) PCT Pub. No.: WO2013/095528
PCT Pub. Date: Jun. 27, 2013

(65) Prior Publication Data
US 2015/0012385 A1    Jan. 8, 2015

(51) Int. Cl.
*G06Q 30/00* (2012.01)
*G06Q 30/06* (2012.01)
(Continued)

(52) U.S. Cl.
CPC ......... *G06Q 30/0623* (2013.01); *G06Q 30/06* (2013.01); *G06Q 30/0639* (2013.01); *G06Q 50/01* (2013.01); *G06Q 50/10* (2013.01)

(58) Field of Classification Search
CPC ............ G06C 30/0601–30/0645; G06C 30/08; G06Q 30/0623; G06Q 30/06;
(Continued)

(56) References Cited

U.S. PATENT DOCUMENTS 7,680,697 B2 *  3/2010  Hearn et al. ............... 705/26.62
8,370,209 B2 *  2/2013  O'Dell .......................... 705/26.1
(Continued)

FOREIGN PATENT DOCUMENTS

CN         1454361 A      11/2003
CN       101589293 A      11/2009
(Continued)

OTHER PUBLICATIONS

"Undercover Tourist: iPhone App Cuts Wait Times at Walt Disney World," Anonymous. Travel & Leisure Close—Up Close—Up Media, Inc., Mar. 20, 2010; ProQuest Dialog #818934168, 3pgs.*
(Continued)

*Primary Examiner* — Robert M Pond
(74) *Attorney, Agent, or Firm* — Schwegman Lundberg & Woessner, P.A.

(57) ABSTRACT

Various systems and methods for obtaining vendor information using mobile internet devices are described herein. An inquiry for a product or service is received from a user. A location for the receipt of the product or service is received. Vendor information of a vendor of the product or service proximate to the location is determined, with the vendor information including a price for the product or service, and a wait time to receive the product or service. The vendor information is then transmitted to the user.

24 Claims, 4 Drawing Sheets

(51) Int. Cl.
*G06Q 50/10* (2012.01)
*G06Q 50/00* (2012.01)

(58) Field of Classification Search
CPC .... G06Q 30/0639; G06Q 50/01; G06Q 50/10; G06Q 30/0601–30/0645; G06Q 30/08
USPC .................. 705/26.1–27.2, 26.61, 26, 27
See application file for complete search history.

(56) References Cited

U.S. PATENT DOCUMENTS

| | | | | |
|---|---|---|---|---|
| 8,855,364 | B2* | 10/2014 | Loos | G06K 9/00778 348/169 |
| 2003/0120728 | A1* | 6/2003 | Kuroda | G06Q 10/109 709/203 |
| 2003/0163427 | A1* | 8/2003 | Fung | G06Q 20/20 705/51 |
| 2004/0260513 | A1* | 12/2004 | Fitzpatrick | G06Q 10/06 702/182 |
| 2005/0139662 | A1* | 6/2005 | Eglen | G06Q 30/06 235/383 |
| 2007/0150369 | A1 | 6/2007 | Zivin | |
| 2008/0033831 | A1 | 2/2008 | Boss et al. | |
| 2008/0104227 | A1* | 5/2008 | Birnie | H04W 4/02 709/224 |
| 2009/0055208 | A1* | 2/2009 | Kaiser | G06Q 10/02 705/5 |
| 2009/0070228 | A1 | 3/2009 | Ronen | |
| 2010/0017861 | A1 | 1/2010 | Krishnaswamy et al. | |
| 2010/0063854 | A1* | 3/2010 | Purvis | G06Q 10/02 705/5 |
| 2010/0089993 | A1* | 4/2010 | Shin | G06Q 30/06 235/375 |
| 2011/0243553 | A1* | 10/2011 | Russell | 398/25 |
| 2012/0116789 | A1* | 5/2012 | Boss | G06Q 10/06 705/1.1 |
| 2012/0116863 | A1* | 5/2012 | Boss | G06Q 30/0235 705/14.35 |
| 2012/0303417 | A1* | 11/2012 | Yeh | G06O 30/0206 705/7.35 |

FOREIGN PATENT DOCUMENTS

| | | |
|---|---|---|
| CN | 101731000 A | 6/2010 |
| CN | 104011759 A | 8/2014 |
| EP | 2795561 A1 | 10/2014 |
| KR | 1020090009628 A | 1/2009 |
| KR | 1020110022518 A | 3/2011 |
| TW | 201118619 A | 6/2011 |
| TW | 201144767 A | 12/2011 |
| TW | 201342291 A | 10/2013 |
| TW | I554967 B | 10/2016 |
| WO | WO-2008074519 A1 | 6/2008 |
| WO | WO-2013095528 A1 | 6/2013 |

OTHER PUBLICATIONS

"International Application Serial No. PCT/US2011/066935, Search Report dated Sep. 24, 2012", 3 pgs.
"International Application Serial No. PCT/US2011/066935, Written Opinion dated Sep. 24, 2012", 5 pgs.
"Taiwanese Application Serial No. 101147792, Response filed Jun. 22, 2015 to Office Action dated Mar. 20, 2015", 102 pgs.
"Taiwanese Application Serial No. 101147792, Response filed Jun. 8, 2016 to Office Action dated Mar. 9, 2016", W/ English Translation of Claims, 69 pgs.
"Chinese Application Serial No. 201180075693.5, Office Action dated May 4, 2016", w/English Translation, 28 pgs.
"European Application Serial No. 11877699.6, Response filed Mar. 29, 2016 to Extended European Search Report dated May 13, 2015", 9 pgs.
"Taiwanese Application Serial No. 101147792, Office Action dated Mar. 9, 2016", With English Translation, 16 pgs.
"Chinese Application Serial No. 201180075693.5, Office Action dated Jan. 10, 2017", w/English Translation, 27 pgs.
"Chinese Application Serial No. 201180075693.5, Response filed Sep. 19, 2016 to Office Action dated May 4, 2016", w/ English Translation, 19 pgs.
"European Application Serial No. 11877699.6, Communication Pursuant to Article 94(3) EPC dated Jan. 25, 2017", 7 pgs.
"Chinese Application Serial No. 201180075693.5, Amendment filed Jun. 25, 2014", W/ English Translation, 69 pgs.
"European Application Serial No. 11877699.6, Extended European Search Report dated May 13, 2015", 6 pgs.
"International Application Serial No. PCT/US2011/066935, International Preliminary Report on Patentability dated Jul. 3, 2014", 7 pgs.
"Taiwanese Application Serial No. 101147792, Office Action dated Mar. 20, 2015", W/ Search Report Translation, 8 pgs.
"Chinese Application Serial No. 201180075693.5, Decision of Rejection dated Dec. 1, 2017", w/ English machine translation, 15 pgs.
"Chinese Application Serial No. 201180075693.5, Response filed Sep. 28, 2017 to Office Action dated Jul. 17, 2017", w/ claims in English, 14 pgs.
"Chinese Application Serial No. 201180075693.5, Office Action dated Jul. 17, 2017", w/English Translation, 29 pgs.
"Chinese Application Serial No. 201180075693.5, Response filed Mar. 24, 2017 to Office Action dated Jan. 10, 2017", w/ claims in English, 14 pgs.
Liu, Haitao, et al., "Application of the Internet of Things Technology", China Machine Press, w/ partial English Translation, [Online]. [Accessed Nov. 18, 2017]. Retrieved from the Internet: <URL: http://img/duxiu.com/n/print.jsp>, (May 2011), 5 pgs.
"Chinese Application Serial No. 201180075693.5, Request for Reexamination filed Mar. 15, 2018 to Decision of Rejection dated Dec. 1, 2017", w/ English claims, 15 pgs.

* cited by examiner

OBTAINING VENDOR INFORMATION USING MOBILE INTERNET DEVICES

CLAIM OF PRIORITY

This application is a U.S. National Stage Filing under 35 U.S.C. 371 from International Application No. PCT/US2011/066935, filed on Dec. 22, 2011, entitled OBTAINING VENDOR INFORMATION USING MOBILE INTERNET DEVICES, which application is incorporated herein by reference in its entirety.

TECHNICAL FIELD

Embodiments pertain to the use of mobile electronic devices and electronic commerce activities.

BACKGROUND

As an increasing number of businesses use online services to advertise their products and services, consumers are consequently able to access increasing amounts of information regarding these products and services. However, with the large number of people and businesses online, there is a risk of having too much information such that a consumer is unable to make efficient purchase decisions. There is a need for a system that provides organized information so that the consumer may make efficient purchase decisions.

DETAILED DESCRIPTION

Figure 1:
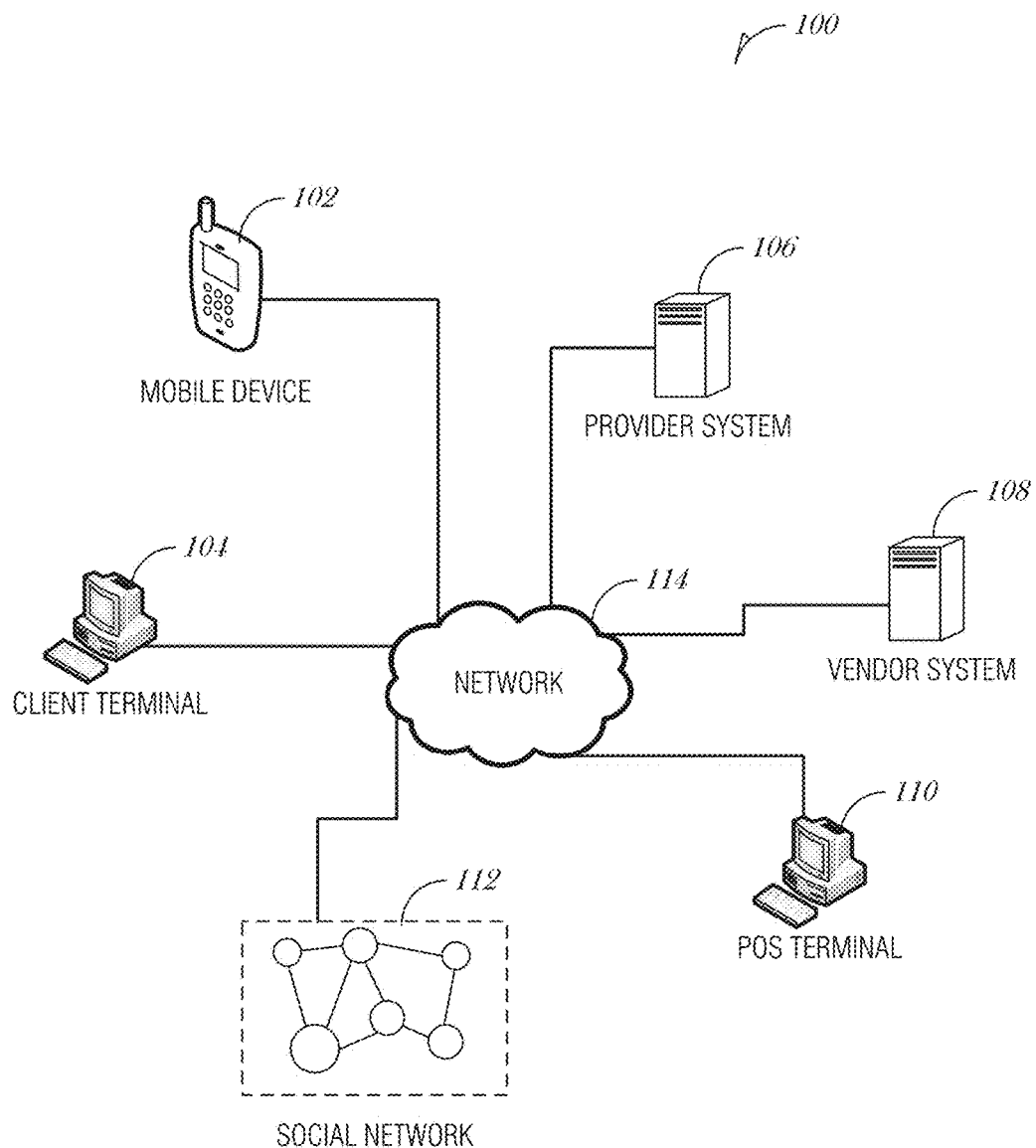
FIG. 1 is a schematic diagram illustrating a system for providing product or service information to a user, according to an example embodiment.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The cloud includes various data sources comprising an enormous amount of data, but that data is not available to the consumer in a context-aware, real time manner. The following disclosure describes a system that allows users to actively or passively signal their needs to or wants for a good or service via a device to a cloud-based service, which puts them in touch with vendors or friends who are nearby and may satisfy those needs or wants. In this way, the vast resources contained in the cloud may be customized to a user based on current location, personal context, preferences, finances, etc. Such a system also address the problem of fine-grained supply and demand by creating micro-markets for consumer goods and services. Vendors may be able to offer lower prices based on instantaneous demand and inventory. This creates new pricing efficiencies in labor costs, inventory storage, and initial material costs. Thus, the disclosure provides a potential solution to the problem of efficient decision making in consumer commodity purchases of goods and services using real time information exchange.

The present disclosure provides techniques and configurations used for providing real-time information of a product or service to a user (e.g., potential consumer). This may improve transaction efficiency between producer and consumer by providing targeted advertising and information exchange to the consumer from the producer, resulting in sales that the producer may not have otherwise realized. Additionally, this information exchange may further enable users to receive more comprehensive and accurate information about a product or service, and assist the user in the decision making process involving the product or service.

As used herein, the term "producer" refers to a person, business, or other entity that creates, provides, or sells a product, service, or combination of a product and service. Examples or producers include, but are not limited to, retail locations (e.g., TARGET® or WAL-MART®), wholesale locations (e.g., a lumber exchange or a grocery supplier), and professional services (e.g., auto service shops, attorneys, and physicians).

As used herein, the term "consumer" refers to a person, business, or other entity that purchases, leases, rents, or otherwise consumes goods and services provided by one or more producers.

As used herein, the term "social network" refers to a consumer's online acquaintances connected by one or more online social network services. A consumer may be acquainted with another person or business due to a purchase or sale of a good or service, a personal friendship, a work relationship, a familial relationship, a shared educational background, a shared professional status or background, or the like. Examples of social networks include, but are not limited to social communities (e.g., FACEBOOK®, FLICKR®, and GOOGLE+™), professional communities (e.g., LINKEDIN® and VIADEO®), ecommerce communities (e.g., EBAY® and AMAZON.COM®), or other communities.

Using the embodiments described herein, a user may obtain information regarding a product or service, which is provided nearby to a location of interest. The location of interest may be the user's location or it may be a location supplied by the user. The user may access such information on a mobile device or at an installed, relatively stationary device. Mobile devices may include devices such as mobile phones, smartphones, tablet computers, laptop computers, personal digital assistants, and the like. Installed devices may include devices such as kiosks and information centers. Some devices, such as a vehicle navigation system may be considered an installed mobile device. Information provided to the user may be obtained from retailers or wholesalers of the product or service, sources of reviews of the product or service, the user's social network, or other data sources.

A variety of techniques and configurations may be used to provide the automatic context-aware execution of data collection, transmission, correlation, and presentation of product or service information. Moreover, a system architecture to implement the presently described techniques may be provided to support any combination of internet connectivity, near field communications (NFC), correlation information, shopping referral information, and internet-derived information. An application supported by the system architecture may provide a display of multimedia data in a variety of formats and form factors, delivered to provide a user with an improved experience.

FIG. 1 is a schematic diagram illustrating a system 100 for providing product or service information to a user, according to an example embodiment. FIG. 1 includes a mobile device 102, a client terminal 104, a provider system 106, a vendor system 108, a point of sale (POS) terminal 110, and a social network 112, all interconnected via a network 114.

The mobile device 102 includes devices such as a smartphone, cellular telephone, mobile phone, laptop computer, tablet computer, or other portable networked device. In general, the mobile device is small and light enough to be considered portable and includes a mechanism to connect to a network, either over a persistent or intermittent connection.

The client terminal 104 may be equipped similar to the mobile device 102 in that it includes network capabilities and a user interface to receive information from a user and provide information to a user. Examples of client terminals include, but are not limited to, information kiosks, automotive navigation systems, desktop computers, and thin clients.

The provider system 106 may be configured to provide a product-or-service information retrieval service to a user at the mobile device 102 or client terminal 104. The provider system 106 may provide the information retrieval service on a subscription basis to the user, for example. As another example, the provider system 106 may partner with one or more vendors to provide information of such vendors to the user upon request.

The provider system 106 may communicate with internal databases or file servers to publish or serve files via a web server. The provider system 106 may include a web server. The web server may consist of scripts, applications, or library files that provide primary or auxiliary functionality to the web server (e.g., multimedia, file transfer, or dynamic interface functions). The web server, either alone or in conjunction with one or more other computers in the provider system 106, may provide a user-interface. The user-interface may be implemented using a variety of programming languages or programming methods, such as HTML (HyperText Markup Language), VBScript (Visual Basic® Scripting Edition), JavaScript™ XML® (Extensible Markup Language), XSLT™ (Extensible Stylesheet Language Transformations), AJAX (Asynchronous JavaScript and XML), Java™, JFC (Java™ Foundation Classes), and Swing (an Application Programming Interface for Java™).

The vendor system 108 is related to, or maintained by, a vendor of goods or services that may be of interest to a potential consumer. The vendor system 108 may include a client database containing records of past, existing, or potential clients of the vendor; a sales database containing records of prior sales transactions; and a product/service database containing information regarding products or services the vendor offers for sale. Information from one or more of such databases may be made available to the provider system 106 for presentation in some form to the user at the mobile device 102 or client terminal 104. In some embodiments, the vendor system 110 tracks current wait times for customers at a location where the vendor operates.

The provider system 106 or the vendor system 108 may represent a group of two or more servers, cooperating with each other, provided by way of a pooled, distributed, or redundant computing model. Further, either the provider system 106 or the vendor system 108 may be implemented as a distributed system; for example, one or more elements of the provider system 106 may be located across a wide-area network from other elements of the provider system 106.

The POS terminal 110 is an electronic device that resides at location where a transaction occurs. The POS terminal 110 may include hardware and software for consummation of a sale. For example, the POS terminal 110 may be an electronic cash register. The POS terminal 110 may include sensors or input integrated or coupled to the POS terminal 100 that detects or receives data to compute an average wait time, an estimated wait time, or an actual wait time for checkout at the POS terminal 110, or among a plurality of POS terminals 110. For example, in a manned POS terminal 110, the cashier may have a user interface control to provide the number of people in the checkout lane, which may then be used to compute an estimated wait time for a newly arrived person at the POS terminal 110. As another example, the POS terminal 110 may be coupled to a sensor, such as a camera, that is able to detect the queue length (e.g., number of people in line or number of cars in line). Other types of sensors that may be used to determine queue length include, but are not limited to, motion detection sensors, infrared detectors, audio detectors, magnetic detectors, radio frequency identification (RFID) tags, and the like. Some of these types of detectors may be used in the following manner to detect or determine queue length. Using an average service time, such as time to check out at a cashier, the queue length may be used to calculate a corresponding wait time.

A gas station may have installed magnetic sensors in the concrete driveways around the gas pumps, similar to those found at stop lights. When a vehicle is relatively stationary, the magnetic field created by the magnetic sensor is interrupted and the vehicle's presence is detected. Using average vehicles lengths, the sensor system may be able to calculate the number of vehicles in line, or at least calculate an estimate useful for determining queue length and resulting wait time.

A retail checkout line may include an infrared sensor to determine the number of people in line by analyzing heat patterns. Alternatively, or in addition, the retail location may use RFID tags in the shopping carts and handheld baskets. With a near field detector, the RFID sensor may be able to determine the number of carts and baskets in a particular checkout line, and then calculate the resulting estimated wait time.

Returning to FIG. 1, the social network 112 includes an online social network of the user of the mobile device 102 or client terminal 104. Data is available in such social networks 112, including the physical location of members in the social network 112, the likes and dislikes of such members, reviews or past experiences at vendors that the members provide, past purchases or purchase decisions that the members provide, and other data related to shopping experiences, vendor experiences, and the like.

The network 114 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LANs or WANs, such as the Internet. The various devices coupled to the network 114 may be coupled to the network 114 via one or more wired or wireless connections.

Using the mobile device 102 or client terminal 104, a user may search for a product or service to purchase or receive.

For example, the provider system 106 may provide a user interface via a web site, in which the user may provide a textual search string. A location is obtained. The location may be of the user, such as by querying the user's device to obtain a location via global positioning system (GPS) integrated in the device. Alternatively, the location may be provided by the user. For example, in some cases, the user may be travelling to a destination, and wish to obtain information relevant to the eventual destination. In this case, the user's current location is irrelevant for the user's query.

The user's search string is used to search for vendors offering products or services that are relevant to the user's search query and are proximate to the provided location. The provider system 106 may operate as a targeted advertising system for vendors that look to advertise via the provider system 106. In this case, the provider system 106 may only provide results that include participating vendors. Alternatively, the provider system 106 may include results of non-participating vendors, but give participating vendors better placement in the search results, a unique or special user interface element to emphasize the participating vendors, or other preferred treatment. The provider system 106 or the owner of the provider system 106 may have advertising agreements in place with the vendor corresponding to the vendor system 108.

Additionally, when the search is performed, data indicating wait times is obtained. The data may be real time, or close to real time, as provided by a cashier at a POS terminal 110 or by sensors coupled to a POS terminal 110. The data may be based in whole or part on historical data. For example, data on queue lengths and wait times may be collected and analyzed for one month, and then reused for the subsequent five months, to be recomputed in the beginning of the next 6-month period.

The provider system 106 may obtain the queue length or wait time data directly from the POS terminal 110 or indirectly via the vendor system 108, in various embodiments. As one example, the POS terminal 110 may be configured to advertise or broadcast the queue length or wait time data to the network 114. Using secured protocols, the provider system 106 may access the queue length or wait time data from the POS terminal 110 and transmit wait time data to the user at the mobile device 102 or client terminal 104. In this manner, various back-end cloud providers may connect with each other, and front end application software may be developed to collect, analyze, process, and provide information regarding the data. To ensure data security, the secured protocols may include various mechanisms, such as encrypted data transmission, proprietary message structures (e.g., a proprietary XML message structure), challenge-response protocols, virtual private networks, or the like.

In some embodiments, social network data obtained from the social network 112 is included with the search results. Social network data may include reviews, likes and dislikes, the presence of a member of the social network 112, or other data related to the vendor or the vendor's products or services.

The vendor data, wait time data, and possibly the social network data is returned to the user at the mobile device 102 or client terminal 104 in a formatted output. The formatted output may be sorted or filtered in various ways. For example, the formatted output may be sorted or filtered by distance to the vendor's location, travel time, or wait time. Other operations may include sorting or filtering by reviews of members of the user's social network.

The formatted output may be sorted or filtered by user preferences. For example, the user may indicate that vendors with a rating of less than some threshold are to be omitted from the search results. The ratings may be from members of the user's social network, third party reviewers, or the user's own ratings. For example, the user may indicate that vendors with a rating based on social network data, having less than some threshold are to be omitted from the search results.

In some embodiments, when a user chooses or selects a vendor from the search result list, the application on the mobile device 102 or client terminal 104 provides one or more travel routes. This may be useful to a driver or occupant in a vehicle equipped with an onboard navigation or personal assistant system.

In some embodiments, the application on the mobile device 102 or client terminal 104 provides a mechanism for the user to provide feedback or ratings of the vendor, product, or service obtained. This data may be fed back into the social network 112, vendor system 108, or provider system 106. Members of the user's social network 112 are able to leverage the personal experiences of the user. The vendor may take action to remedy weaknesses or other issues with products or services offered by the vendor. The provider system 106 may store feedback or ratings and make such data available to other subscribers or users of the provider system 106.

Figure 2:
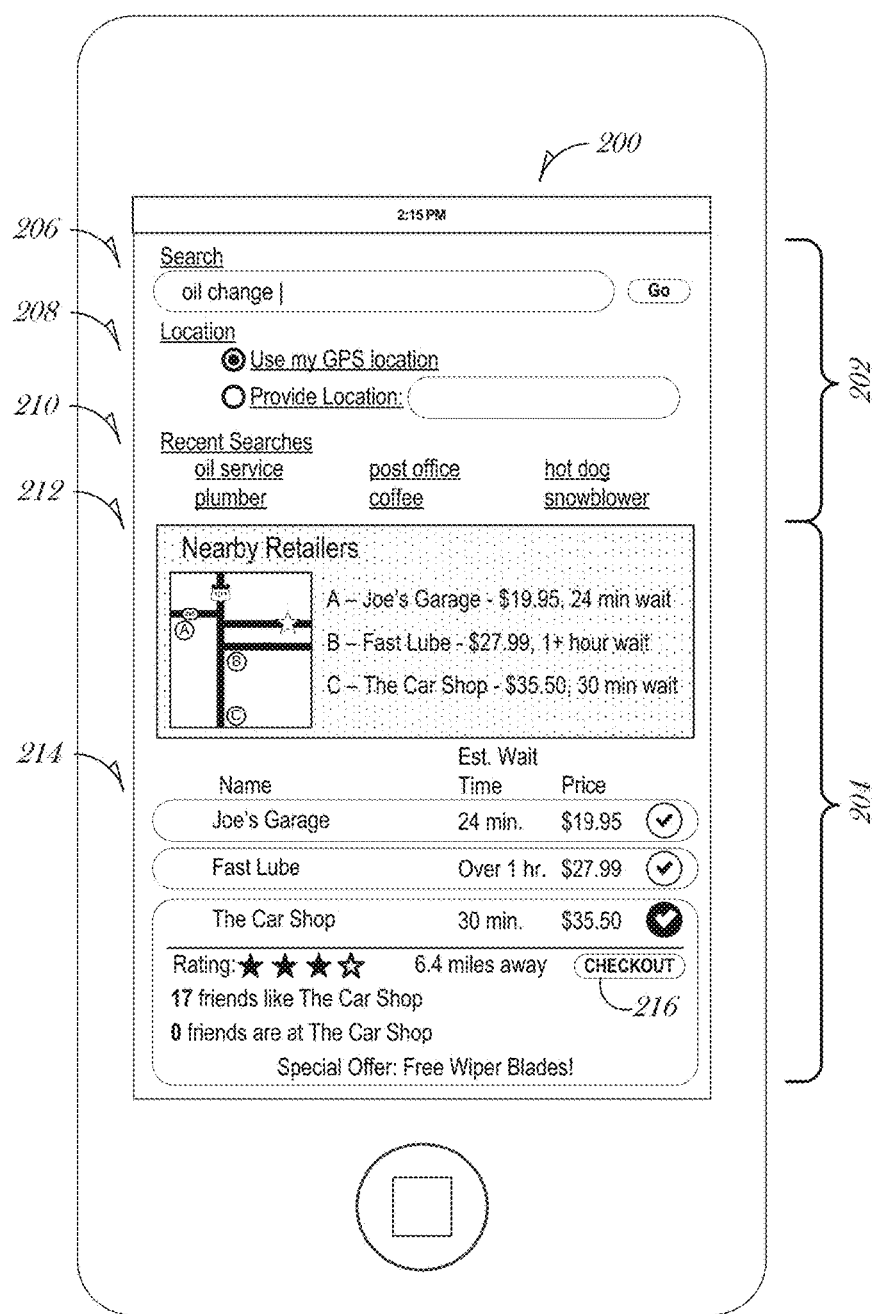
FIG. 2 is a schematic diagram illustrating a graphical user interface providing product information, according to an example embodiment.

FIG. 2 is a schematic diagram illustrating a graphical user interface 200 providing product information, according to an example embodiment. The illustration of the particular graphical user interface 200 and the content included therein is provided as one non-limiting example of a display, it is appreciated that numerous other configurations and designs may be implemented for such a graphical user interface.

The graphical user interface 200 includes a search interface 202 and a search results interface 204. The search interface 202 includes a search field 206, location controls 208, and recent searches 210. The search field 206 may be used to provide a description of the product or service that the user is interested in purchasing or receiving. The user may provide a location or use the device's GPS location with the location controls 208. By default, in an example embodiment, the application will use the device's GPS location. Recent searches 210 are provided in this example interface. The number of recent searches 210 available may be configurable by the user. A default value, for example six searches, as shown, may be used in absence of a configured value. Furthermore, searches may be saved to be reused as "favorite" searches, in an embodiment. Saved searches (e.g., favorites) are not illustrated in the example shown in FIG. 2.

After a user has submitted a search, the search results are displayed in the search results interface 204. The search results interface 204 may include a mini-map 212 and zero or more listings 214. The mini-map 212 provides a navigational aid to the user and includes indicia of the listings 214, if any. The mini-map 212 may be an activateable control, for example, where the user may press or click on the mini-map 212 to zoom, pan, or otherwise manipulate the map view contained within.

The listings 214 include details of the vendors that sell products or services related to the user's search. The listings 214 include the vendor's name, an estimated wait time, and a price. By selecting one of the listings 214, additional details may be displayed. In this example, the listing for "The Car Shop" has been selected and a special offer is displayed to the user. Such special offers may be made available exclusively to users of the application. Review information may also be displayed in relation to the listing. Review information may include ratings, commentary, or other information providing summaries, evaluations, or descriptions of a product or service. In this example, the listing includes a three out of four star rating and an indication of friends that like the vendor. In addition, the details may also provide the user an indication of whether anyone from their social network 112 is currently at the vendor's location. Here, there is nobody from the user's social network is at the vendor's location. Such location information may be obtained automatically from mobile devices, for example, using GPS circuits on the mobile devices.

Additionally, after selecting a vendor from the listings 214, the user may purchase the goods or services using the "Checkout" control 216. Checkout may be provided by the provider system 106, vendor system 108, or a third party, such as PAYPAL®. The checkout may use a banking network (PULSE®, PLUS®, CIRRUS®, INTERAC®, INTERSWITCH®, STAR®, and LINK), a payment network (e.g., VISANET® or MASTERCARD®), or other payment network. The user may be provided with an electronic receipt to present to the vendor when receiving the product or service. The electronic receipt may be in the form of an invoice, and may include an identifier, such as a transaction identifier or confirmation code. The identifier may be encoded in a barcode or other indicia, which may then be scanned by a person or machine at the vendor's location to quickly complete the transaction.

After checkout, the user may be provided with the option to view route information guiding the user from the current location to the vendor's location. If the device is incorporated into a navigation system, such as in a vehicle, the route information may be conveyed to the user with turn-by-turn directions. The route information may include a map. In addition, the route information or the map may indicate traffic conditions. In general, routing may take into consideration traffic levels, construction, weather, and other obstacles (e.g., games or events) that may impede or affect the user's progress. This is presented to the user in order to assist in decision making among several vendors.

Figure 3:
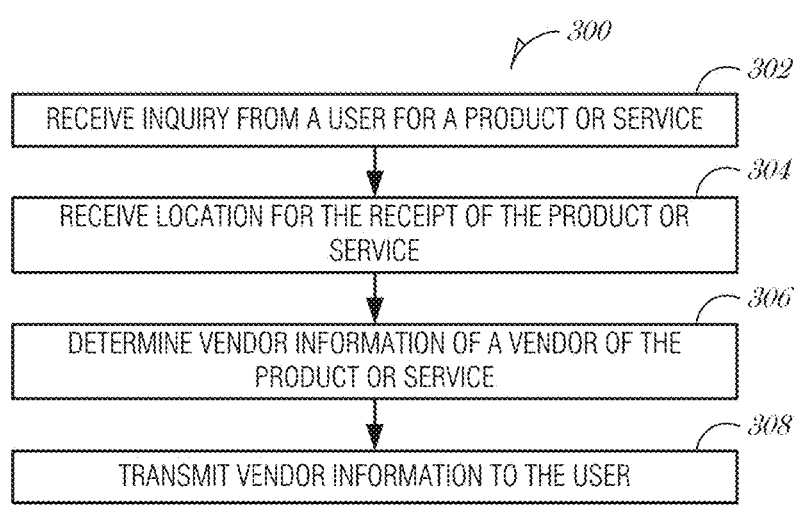
FIG. 3 is a flowchart illustrating a method for providing product or service information to a user, according to an example embodiment.

FIG. 3 is a flowchart illustrating a method 300 for providing product or service information to a user, according to an example embodiment. The following operations are not required to be performed in a consecutive order or sequence, although the illustrated order depicts use of the method in a common shopping experience.

At block 302, an inquiry for a product or service is received from a user. The inquiry may be received at a provider system from a user operating a device, such as a mobile device. In an embodiment, the inquiry for the product or service is received from the user as a text string query. In another embodiment, the inquiry for the product or service is received by receiving an indication of a previously-executed search. As discussed above with reference to FIG. 2, previously-executed searches may be saved temporarily or more permanently for reuse. As an example, the indication of the previously-executed search may be provided by the mobile device to the provider system as a text of a previously-used text string query. As another example, the indication of the previously-executed search may be provided as an index or other keyed value, which is then used by the provider system to lookup the previously executed search and transmit the corresponding search result.

At block 304, a location for the receipt of the product or service is received. In an embodiment, the location for the receipt of the product or service is obtained by detecting a location of the user. For example, the user's location may be inferred by the location of the device interfacing with the provider system. Thus, in a further embodiment, the location of the user is obtained by identifying a location of a mobile device the user is operating. In an alternate embodiment, the location for the receipt of the product or service is received from the user. For example, the user may provide an address, such as a home residence, to use as the location relative to the search.

At block 306, vendor information of a vendor of the product or service proximate to the location is determined. In an embodiment, the vendor information includes a price for the product or service and a wait time to receive the product or service.

In an embodiment, the price for the product or service is determined in part by identifying the user and calculating the price for the product or service based on the identity of the user. For example, the user may be a past customer of the vendor's. After recognizing this, the vendor may provide a "valued customer" special price. As another example, the user may be a member of a club offered by the vendor, such that member pricing is available to the member/user.

In an embodiment, the vendor information comprises rating or review information of the vendor. In a further embodiment, the rating or review information is obtained from a member of the user's social network.

In an embodiment, the price varies dynamically based on real time demand. For example, as queue length or wait time decreases, a vendor may adjust prices to drive business.

At block 308, the vendor information is transmitted to the user.

In a further embodiment, the method 300 includes transmitting to the user, a travel time from the location to the vendor.

In a further embodiment, the method 300 includes transmitting to the user, a travel route from the location to the vendor.

In a further embodiment, the method 300 includes providing a payment interface to the user, receiving a method of payment from the user, and processing the method of payment to pay for the product or service.

In a further embodiment, the method 300 includes providing to the user, an indication of whether an acquaintance of the user is present at the vendor. As illustrated in FIG. 2, the indication may be a textual indication that provides the user information of how many or which friends are at the vendor. Using such information, the user may opt to attend or avoid the particular vendor.

In a further embodiment, the method 300 includes presenting a user interface control to the user, the user interface control configured to provide the user's location to a member of the user's social network. An indication of the user actuating the user interface control is received, and in response to receiving the indication, the user's location is provided to the member of the user's social network.

The following real-life, non-limiting examples provide a series of use-case scenarios. The following examples are intended to be used in conjunction with the embodiments described herein.

As an example, a person wandering around a downtown area may be interested in obtaining coffee. Using the systems and method described, the person may use his smartphone to search for the product "coffee." A listing of three nearby coffee vendors are provided, each with the corresponding price for a cup of coffee and each with corresponding wait times. Weighing the factors, the person may choose to purchase from one vendor over another due to price, wait time, location, brand, reviews, or other information available. Before arriving at the chosen coffee vendor, the person may pay for the coffee and obtain an electronic receipt. The receipt may be in the form of a barcode (e.g, QR code), transaction identifier, confirmation number, or other information to authenticate the transaction and the person. The receipt may be presented to the cashier at the coffee vendor to expedite the transaction. Such mechanisms may increase the sales volume of the vendor, while simultaneously decreasing wait times or other purchase obstacles for the consumer.

As another example, a person may using the systems and methods described to search for a product and view nearby vendors. Along with information indicating the price of the product at one or more of the vendors and a wait time at one or more of the vendors, the person may be provided with review information from various sources, including but not limited to friends, acquaintances, or other people from the person's social network. Reviews may also be obtained from other sources, such as other customers of the respective vendor, professional reviewers, and the like. Using the price, wait time, and review information, the person may make a decision on a vendor to visit.

As another example, a person driving home may be interested in picking up dinner on the way. The person may search for the term "Italian food" and provide a location of the person's home residence, in contrast the current location of the person (in the car). Search results are then provided in an area proximate to the person's house. After selecting and paying for an order, the person may be navigated to the vendor by the in-car navigation system. By using the systems and methods of the present disclosure, the person may reduce or eliminate wait times and arrive home more quickly and with a hot meal.

As another example, a vendor may choose to subscribe and advertise with a provider of location-based services described herein. The vendor may configure systems and sensors, install software or hardware, or train employees to track and maintain queue length or wait times for checkout. The vendor may provide access to the queue length or wait time data so that the provider is able to collect and provide such information to the end user. Alternatively, the vendor may compile this information and provide it to the provider system, such as in a daily, hourly, or minute-by-minute report. The vendor may use advertising budgets to join and participate in the provider's service. Further, the vendor may offer specials or other incentives to uses of the provider's service.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Figure 4:
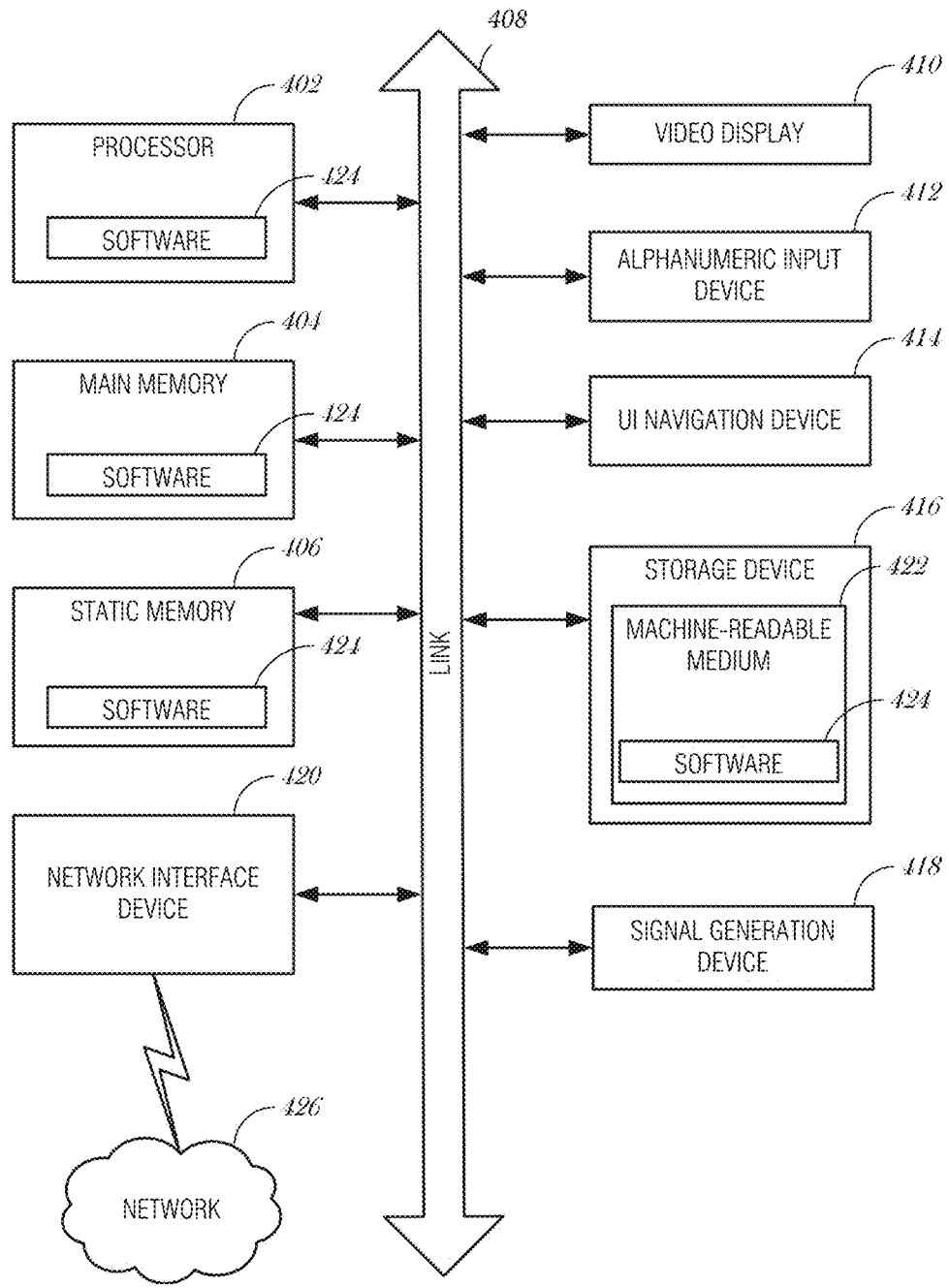
FIG. 4 is a block diagram illustrating a machine in the example form of a computer system, within which a set or sequence of instructions for causing the machine to perform any one of the methodologies discussed herein may be executed, according to an example embodiment.

FIG. 4 is a block diagram illustrating a machine in the example form of a computer system 400, within which a set or sequence of instructions for causing the machine to perform any one of the methodologies discussed herein may be executed, according to an example embodiment. In alternative embodiments, the machine operates as a stand-alone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g, bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Additional Notes & Examples

Example 1 describes a system, method, or computer-readable medium for obtaining vendor information using mobile internet devices that receives, from a user, an inquiry for a product or service. A location for the receipt of the product or service is received. Vendor information of a vendor of the product or service proximate to the location is determined, with the vendor information including at least one of a price for the product or service, or a wait time to receive the product or service. The vendor information is transmitted to the user.

In Example 2, the system, method, or computer-readable medium of Example 1 may be optionally performed or configured such that receiving the inquiry for the product or service comprises receiving a text string query.

In Example 3, the system, method, or computer-readable medium of any one or more of the Examples 1-2 may be optionally performed or configured such that receiving the inquiry for the product or service comprises receiving an indication of a previously-executed search.

In Example 4, the system, method, or computer-readable medium of any one or more of the Examples 1-3 may be optionally performed or configured such that receiving the location for the receipt of the product or service comprises detecting a location of the user.

In Example 5, the system, method, or computer-readable medium of any one or more of the Examples 1-4 may be optionally performed or configured such that detecting the location of the user comprises identifying a location of a mobile device the user is operating.

In Example 6, the system, method, or computer-readable medium of any one or more of the Examples 1-5 may be optionally performed or configured such that receiving the location for the receipt of the product or service comprises receiving the location from the user.

In Example 7, the system, method, or computer-readable medium of any one or more of the Examples 1-6 may be optionally performed or configured such that to determine the price for the product or service, the user is identified and the price for the product or service is calculated based on the identity of the user.

In Example 8, the system, method, or computer-readable medium of any one or more of the Examples 1-7 may be optionally performed or configured such that the price varies dynamically based on real time demand.

In Example 9, the system, method, or computer-readable medium of any one or more of the Examples 1-8 may be optionally performed or configured such that the vendor information comprises review information of the vendor.

In Example 10, the system, method, or computer-readable medium of any one or more of the Examples 1-9 may be optionally performed or configured such that the review information is obtained from a member of the user's social network.

In Example 11, the system, method, or computer-readable medium of any one or more of the Examples 1-10 may be optionally performed or configured to transmit to the user, a travel time from the location to the vendor.

In Example 12, the system, method, or computer-readable medium of any one or more of the Examples 1-11 may be optionally performed or configured to transmit to the user, a travel route from the location to the vendor.

In Example 13, the system, method, or computer-readable medium of any one or more of the Examples 1-12 may be optionally performed or configured to provide a payment interface to the user, receive a method of payment from the user, and process the method of payment to pay for the product or service.

In Example 14, the system, method, or computer-readable medium of any one or more of the Examples 1-13 may be optionally performed or configured to provide to the user, an indication of whether an acquaintance of the user is present at the vendor.

In Example 15, the system, method, or computer-readable medium of any one or more of the Examples 1-14 may be optionally performed or configured to present a user interface control to the user, the user interface control configured to provide the user's location to a member of the user's social network, receive an indication of the user actuating the user interface control, and in response to receiving the indication, provide the user's location to the member of the user's social network.

Example 16 describes a system, method, or computer-readable medium for obtaining vendor information using mobile internet devices that receives at a processor-based system, from a user, an inquiry for a product or service. A location for the receipt of the product or service is received. Vendor information of a vendor of the product or service proximate to the location is determined, with the vendor information including at least one of a price for the product or service, or a wait time to receive the product or service. The vendor information is transmitted to the user.

In Example 17 the system, method, or computer-readable medium of Example 16 may be optionally performed or configured such that to receive the inquiry for the product or service a text string query is received.

In Example 18, the system, method, or computer-readable medium of any one or more of the Examples 16-17 may be optionally performed or configured such that to receive the location for the receipt of the product or service, a location of the user is detected by identifying a location of a mobile device the user is operating.

In Example 19, the system, method, or computer-readable medium of any one or more of the Examples 16-18 may be optionally performed or configured such that the price for the product or service is determined in part by the user's identity or location.

In Example 20, the system, method, or computer-readable medium of any one or more of the Examples 16-19 may be optionally performed or configured such that the price varies dynamically based on real time demand.

In Example 21, the system, method, or computer-readable medium of any one or more of the Examples 16-20 may be optionally performed or configured such that the vendor information comprises review information of the vendor.

In Example 22, the system, method, or computer-readable medium of any one or more of the Examples 16-21 may be optionally performed or configured such that the review information is obtained from a member of the user's social network.

In Example 23, the system, method, or computer-readable medium of any one or more of the Examples 16-22 may be optionally performed or configured such that a travel time from the location to the vendor is transmitted to the user.

In Example 24, the system, method, or computer-readable medium of any one or more of the Examples 16-23 may be optionally performed or configured such that a travel route from the location to the vendor is transmitted to the user.

In Example 25, the system, method, or computer-readable medium of any one or more of the Examples 16-24 may be optionally performed or configured such that a payment interface is provided to the user and a method of payment is received from the user. The method of payment is processed to pay for the product or service.

In Example 26, the system, method, or computer-readable medium of any one or more of the Examples 16-25 may be optionally performed or configured such that the an indication of whether an acquaintance of the user is present at the vendor is provided to the user.

In Example 27, the system, method, or computer-readable medium of any one or more of the Examples 16-26 may be optionally performed or configured such that a user interface control is presented to the user, the user interface control configured to provide the user's location to a member of the user's social network. An indication of the user actuating the user interface control is received, and in response to receiving the indication, providing the user's location to the member of the user's social network.

Example 28 describes a system, method, or computer-readable medium for obtaining vendor information using mobile internet devices that includes a mobile wireless device connected to a provider computer network, the mobile wireless device to receive, from a user of the mobile wireless device, an inquiry for a product or service; provide the inquiry for the product or service to the provider computer network; receive, from the provider network, vendor information of a vendor proximate to the location of the user, the vendor information including at least one of a price for the product or service, or a wait time to receive the product or service; and present the vendor information to the user of the mobile wireless device.

In Example 29 the system, method, or computer-readable medium of Example 28 may be optionally performed or configured such that the mobile wireless device receives the inquiry for the product or service by receiving a text string query.

In Example 30, the system, method, or computer-readable medium of any one or more of the Examples 28-29 may be optionally performed or configured such that the mobile wireless device receives the inquiry for the product or service by receiving an indication of a previously-executed search.

In Example 31, the system, method, or computer-readable medium of any one or more of the Examples 28-30 may be optionally performed or configured such that the mobile wireless device receives the location for the receipt of the product or service by detecting a location of the user.

In Example 32, the system, method, or computer-readable medium of any one or more of the Examples 28-31 may be optionally performed or configured such that the mobile wireless device identifies a location of a mobile device the user is operating to detect the location of the user.

In Example 33, the system, method, or computer-readable medium of any one or more of the Examples 28-32 may be optionally performed or configured such that the mobile wireless device receives the location for the receipt of the product or service by receiving the location from the user.

In Example 34, the system, method, or computer-readable medium of any one or more of the Examples 28-33 may be optionally performed or configured such that the price for the product or service is determined in part by identifying the user and calculating the price for the product or service based on the identity of the user.

In Example 35, the system, method, or computer-readable medium of any one or more of the Examples 28-34 may be optionally performed or configured such that the price varies dynamically based on real time demand.

In Example 36, the system, method, or computer-readable medium of any one or more of the Examples 28-35 may be optionally performed or configured such that the vendor information comprises review information of the vendor.

In Example 37, the system, method, or computer-readable medium of any one or more of the Examples 28-36 may be optionally performed or configured such that the review information is obtained from a member of the user's social network.

In Example 38, the system, method, or computer-readable medium of any one or more of the Examples 28-37 may be optionally performed or configured such that the mobile wireless device is configured to transmit to the user, a travel time from the location to the vendor.

In Example 39, the system, method, or computer-readable medium of any one or more of the Examples 28-38 may be optionally performed or configured such that the mobile wireless device is configured to transmit to the user, a travel route from the location to the vendor.

In Example 40, the system, method, or computer-readable medium of any one or more of the Examples 28-39 may be optionally performed or configured such that the mobile wireless device is configured to provide a payment interface to the user; receive a method of payment from the user; and process the method of payment to pay for the product or service.

In Example 41, the system, method, or computer-readable medium of any one or more of the Examples 28-40 may be optionally performed or configured such that the mobile wireless device is configured to provide to the user, an indication of whether an acquaintance of the user is present at the vendor.

In Example 42, the system, method, or computer-readable medium of any one or more of the Examples 28-41 may be optionally performed or configured such that the mobile wireless device is configured to: present a user interface control to the user, the user interface control configured to provide the user's location to a member of the user's social network; receive an indication of the user actuating the user interface control; and in response to receiving the indication, provide the user's location to the member of the user's social network.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. At least one non-transitory machine readable medium for determining a queue length and obtaining vendor information using mobile internet devices comprising a plurality of instructions that in response to being executed on a computing device, cause the computing device to:
receive, from a user, an inquiry for a product or service;
receive a location of a vendor of the product or service;
receive sensor information from one or more magnetic detectors and an infrared sensor located at the location of the vendor of the product or service;
determining the queue length based on the sensor information received, wherein determining the queue length includes creating, by the magnetic detectors, a magnetic field proximate the queue, and detecting, by the magnetic detectors, an interruption or disturbance in the magnetic field, and analyzing one or more heat patterns detected by the infrared sensor, the interruption or disturbance and the heat patterns correlating to the queue length;
determine a wait time to receive the product or service based on the queue length and an average service time;
determine a price for the product or service based on the queue length, wherein the price dynamically varies based on the queue length;
determine vendor information of the vendor of the product or service, the vendor information including the price and the wait time to receive the product or service; and
transmit the vendor information to a mobile device of the user.

2. The at least one non-transitory machine readable medium claim 1, wherein the instructions to receive the inquiry for the product or service comprise instructions to receive a text string query.

3. The at least one non-transitory machine readable medium of claim 1, wherein the instructions to receive the inquiry for the product or service comprise instructions to receive an indication of a previously-executed search.

4. The at least one non-transitory machine readable medium of claim 1, wherein the instructions to receive the location of the vendor of the product or service comprise instructions to detect a location of the user.

5. The at least one non-transitory machine readable medium of claim 4, wherein detecting the location of the user comprises identifying a location of the mobile device of the user.

6. The at least one non-transitory machine readable medium of claim 1, wherein the instructions to receive the location of the vendor of the product or service comprise instructions to receive the location from the user.

7. The at least one non-transitory machine readable medium of claim 1, further comprising determining a price for the product or service, wherein the price for the product or service is determined in part by:
identifying the user; and
calculating the price for the product or service based on the identity of the user.

8. The at least one non-transitory machine readable medium of claim 1, wherein the vendor information comprises review information of the vendor.

9. The at least one non-transitory machine readable medium of claim 8, wherein the review information is obtained from a member of the user's social network.

10. The at least one non-transitory machine readable medium of claim 1, further comprising instructions to transmit to the user, a travel time from a location of the user to the location of the vendor.

11. The at least one non-transitory machine readable medium of claim 1, further comprising instructions to transmit to the user, a travel route from a location of the user to the location of the vendor.

12. The at least one non-transitory machine readable medium of claim 1, further comprising instructions to:
provide a payment interface to the user;
receive a method of payment from the user; and
process the method of payment to pay for the product or service.

13. The at least one non-transitory machine readable medium of claim 1, further comprising instructions to provide to the user, an indication of whether an acquaintance of the user is present at the vendor.

14. The at least one non-transitory machine readable medium of claim 1, further comprising instructions to:
present a user interface control to the user, the user interface control configured to provide the user's location to a member of the user's social network;
receive an indication of the user actuating the user interface control; and
in response to receiving the indication, provide the user's location to the member of the user's social network.

15. The at least one non-transitory machine readable medium of claim 1, wherein the vendor information further includes an instantaneous demand for the product or service and an instantaneous supply of the product or service.

16. The at least one non-transitory machine readable medium of claim 1, wherein the one or more sensors located at the location of the vendor further includes at least one of a camera, a motion detection sensor, and an audio detector.

17. The at least one non-transitory machine readable medium of claim 1, further comprising instructions to:
collect service time data for a prescribed time period; and
compute the average service time for the prescribed time period and reusing the average service time for a future time period.

18. The at least one non-transitory machine readable medium of claim 17, wherein the prescribed time period is a month and the future time period is five months.

19. A method for determining a queue length and obtaining vendor information using mobile internet devices comprising:
receiving at a processor-based system, from a user, an inquiry for a product or service;
receiving a location of a vendor of the product or service;
receiving sensor information from one or more magnetic detectors and an infrared sensor located at the location of the vendor of the product or service;
determining the queue length based on the sensor information received, wherein determining the queue length includes creating; by the magnetic detectors, a magnetic field proximate the queue and detecting, by the magnetic detectors, an interruption or disturbance in the magnetic field, and analyzing one or more heat patterns detected by the infrared sensor, the interruption or disturbance and heat patterns correlating to the queue length;
determine a price for the product or service based on the queue length, wherein the price dynamically varies based on the queue length;

determining a wait time to receive the product or service based on the queue length and an average service time; and transmitting the price and the wait time to a mobile device of the user.

20. A system for determining a queue length and obtaining vendor information using mobile internet devices comprising:

a mobile wireless device connected to a provider computer network, the mobile wireless device to:

receive, from a user of the mobile wireless device, an inquiry for a product or service;

provide the inquiry for the product or service to the provider computer network;

receive, from the provider network, vendor information of a vendor proximate to the location of the user, the vendor information including a price and a wait time to receive the product or service based on a queue length determined by the provider computer network using sensor information from one or more magnetic detectors and an infrared sensor located at the vendor proximate to the location of the user and an average service time, wherein the queue length is determined by creating, by the magnetic detectors, a magnetic field proximate the queue and detecting, by the magnetic detectors, an interruption or disturbance in the magnetic field, and analyzing one or more heat patterns detected by the infrared sensor, the interruption or disturbance and the heat patterns correlating to the queue length, and the price dynamically varies for the product or service and is determined based on the queue length; and present the vendor information to the user of the mobile wireless device.

21. The system of claim 20, wherein the vendor information comprises review information of the vendor.

22. The system of claim 21, wherein the review information is obtained from a member of the users social network.

23. The system of claim 20, wherein the mobile wireless device is configured to provide to the user, an indication of whether an acquaintance of the user is present at the vendor.

24. The system of claim 20, wherein the mobile wireless device is configured to:

present a user interface control to the user, the user interface control configured to provide the user's location to a member of the user's social network;

receive an indication of the user actuating the user interface control; and in response to receiving the indication, provide the user's location to the member of the user's social network.

* * * * *

UNITED STATES PATENT AND TRADEMARK OFFICE
CERTIFICATE OF CORRECTION

PATENT NO. : 10,275,817 B2
APPLICATION NO. : 13/991581
DATED : April 30, 2019
INVENTOR(S) : Bahnsen et al.

Page 1 of 1

It is certified that error appears in the above-identified patent and that said Letters Patent is hereby corrected as shown below:

In the Claims

Column 15, Line 36, Claim 2, after "medium", insert --of--

Column 16, Line 58, Claim 19, delete "creating;" and insert --creating,-- therefor Column 18, Line 13, Claim 22, delete "users" and insert --user's-- therefor Signed and Sealed this
Twenty-first Day of April, 2020

Andrei Iancu
*Director of the United States Patent and Trademark Office*